May 23, 1933.  B. W. CHERRY  1,910,088
AIR EXTRACTOR
Filed Sept. 11, 1931
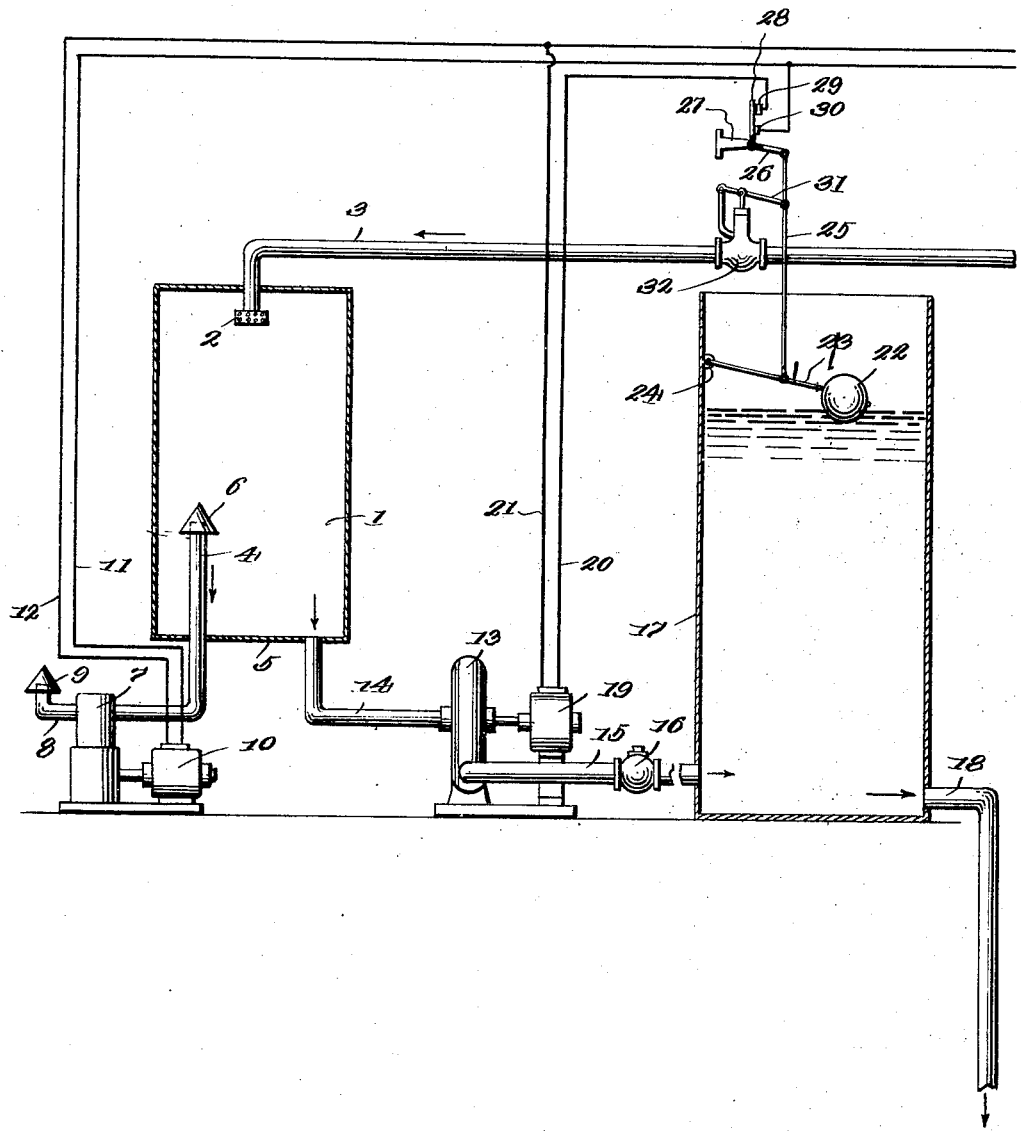
Inventor
BILLY W. CHERRY
By Irving L. McCathran
Attorney Patented May 23, 1933

1,910,088

UNITED STATES PATENT OFFICE

BILLY W. CHERRY, OF CENTERVILLE, TENNESSEE

AIR EXTRACTOR

Application filed September 11, 1931. Serial No. 562,366.

This invention relates to air extractors and has for its object the production of a simple and efficient system and mechanism for deaerating water, whereby air may be extracted from the water to be used in the manufacture of raw water ice.

Another object of this invention is the production of a simple and efficient means for automatically feeding the deaerated water to the storage tank when the water in the storage tank falls below the normal level.

A still further object of this invention is the production of a simple and efficient apparatus for extracting air from water to be used for commercial purposes, such as in the manufacture of ice.

With these and other objects in view, the invention consists in the novel construction, arrangement, and combinations of parts, as will be hereinafter fully described and claimed.

In the drawing:—

The figure is a diagrammatic view of the electrical circuits involved, showing the apparatus in side elevation, the aerating tank and storage tank being shown in section.

By referring to the drawing it will be seen that I provide a vacuum tank 1, which may be supported in any suitable or desired manner, within which vacuum tank 1 is mounted at its upper end a spray nozzle 2, connected to a feed line pipe 3. The vacuum tank 1 is provided with an air-extracting pipe 4 extending up through the bottom 5, and this air extracting pipe 5 is provided with a shield cap 6 at its upper end of an inverted cone shape structure, to permit the air to pass up under the cap 6 as indicated by the arrow. This pipe 4 is connected to a vacuum pump 7 of any suitable or desired type, and this vacuum pump 7 is provided with a discharge pipe 8 having a shield cap 9 of an inverted cone shape structure. A suitable motor 10 is employed for driving the vacuum pump 7 and this motor 10 is driven through the medium of the electrical conducting wires 11 and 12.

A water pump 13 is mounted adjacent the vacuum tank 1 and is connected to the bottom thereof by means of a suction pipe 14 for sucking the water or draining the water from the vacuum tank 1 into the pump 13 when the pump 13 is being actuated. This water pump 13 is connected also to a feed pipe 15, having a check valve 16, the feed pipe 15 being connected to the storage tank 17 near its lower end as illustrated in the drawing. This storage tank 17 is provided with a supply line or pipe 18 for carrying the water to the line of cans, where the water may be converted into ice through the usual freezing methods.

The pump 13 is driven by means of a motor 19 and this motor is driven through the medium of the conducting lines 20 and 21.

Mounted in the upper end of the storage tank 17 is a float 22, which is mounted upon the arm 23, the arm 23 being hingedly connected as at 24 to one side wall of the storage tank 17. A link 25 is connected to the arm 23 intermediate its ends and this link 25 is connected at its extreme end to a bell crank switch 26, pivotally mounted upon the supporting bracket 27, which may be supported in any suitable or desired location. The bell crank lever 26 is preferably insulated from the bracket 27 but is provided with a conducting finger 28, which is adapted to contact with the contact points 29 and 30, which in turn are connected with the feed lines 20 and 11, as shown in the drawing.

When the float assumes the position shown in the drawing or comes to a lowered position, the contacting finger of the bell crank switch 26 will contact with the contact members 29 and 30, thereby closing the circuit through the motor 19 by causing the current to pass down through the wire 12, through the wire 21, through the motor 19, up through the wire 20, through the contact 29, through the finger 28, through the contact 30 and to the negative side of the lines 11.

As shown in the drawing, the link 25 is also connected to a pivoted arm 31, carried by the trip valve 32, which is mounted or carried by the feed line 3, whereby this trip valve will be shut when the trip switch 26 is opened.

From the foregoing description it will be seen that a very simple and efficient means has been produced, whereby the water may be fed through the feed line 3 into the vacuum tank 1, and through the operation of the motor 10 the pump 7 will extract the air from the water which is sprayed from the spray head 2 into the vacuum tank 1. The water is adapted to be sprayed through the head 2 in a fine mist to facilitate the extraction of the air from the water. The water may then be drained from the vacuum tank down through the pipe 14, through the pump 13, through the pipe 15 and check valve 16, into the storage tank 17 and then to a suitable point where the water is to be used by discharging the water through the pipe 18 from the storage tank 17. The automatic valve mechanism will control the operation of the device, so as to close the trip valve 32 when the switch is moved into an open position and open the valve 32 when the switch is in its closed position, thereby regulating the supply of the water from the feed line 3 into the vacuum tank 1 and preventing the flooding of the system.

It should be further understood that the water which is discharged into the vacuum tank 1 through the medium of the spray head 2 is broken up into the fine mist so that the vacuum maintained in the tank may remove all of the air normally present in the water.

It is desired that the air pump operate continuously and when the water level in the storage tank becomes low, the float will drop and automatically open the trip valve allowing the water to pass through the pipe 3 and shut the switch thereby causing the pump 13 to operate.

It should be understood that certain detail changes in mechanical construction may be employed without departing from the spirit of the invention, so long as these changes fall within the scope of the appended claims.

Having described the invention;

What is claimed as new is:

1. An air extractor for the purpose described comprising a vacuum tank, means for creating a vacuum therein, a feed line communicating with said vacuum tank and provided with a spray head for discharging a fine spray of water into said vacuum tank, a storage tank, a water pump interposed between said vacuum tank and said storage tank, a source of electrical supply for operating said pump, a switch for controlling the operation of said pump, a trip valve mounted in said feed line, a float mounted in said storage tank, said trip valve and switch being arranged in alignment, and common means connecting said switch, trip valve and float for simultaneously operating the trip valve and switch and opening the switch when the trip valve is closed and closing the switch when the trip valve is open, said common means actuating a direct push and pull action upon said switch and trip valve.

2. An air extractor for the purpose described comprising a vacuum tank, means for creating a vacuum therein, a feed line communicating with said vacuum tank and provided with a spray head for discharging a fine spray of water into said vacuum tank, a storage tank, a water pump interposed between said vacuum tank and said storage tank, a source of electrical supply for operating said pump, a switch for controlling the operation of said pump, a trip valve mounted in said feed line, a float mounted in said storage tank, said trip valve and switch being arranged in alignment, and common means connecting said switch, trip valve and float for simultaneously operating the trip valve and switch and opening the switch when the trip valve is closed and closing the switch when the trip valve is open, said common means actuating a direct push and pull action upon said switch and trip valve, said trip valve being located above said storage tank, said switch being located directly above said trip valve, and said common means comprising an arm connected to said float and also connected to said trip valve and switch.

3. A device of the class described comprising a vacuum tank, a feed line communicating with said vacuum tank, a storage tank, a float mounted within said storage tank, an arm carried by said float and pivotally mounted upon said storage tank, a trip valve carried by said feed line and mounted above said storage tank, a switch mounted above said trip valve, and in line therewith above said storage tank, a pump interposed between said vacuum and said storage tanks, a source of electrical supply connecting said switch with said pump, a link pivotally connected to said arm carried by said float and also pivotally secured to said trip valve and to said switch for exerting a direct push and pull action upon said trip valve and switch simultaneously with the raising and lowering of said float.

In testimony whereof I affix my signature.

BILLY W. CHERRY.